United States Patent [19]

Dehennau et al.

[11] Patent Number: 5,798,072

[45] Date of Patent: Aug. 25, 1998

[54] PROCESS FOR MOULDING A THERMOPLASTIC MATERIAL BY INJECTION ONTO A ROTATING CORE

[75] Inventors: Claude Dehennau, Waterloo; Vito Leo, Glimes; Charles Cuvelliez, Rhode-Saint-Genese, all of Belgium

[73] Assignee: Solvay (Société Anonyme), Brussels, Belgium

[21] Appl. No.: 691,812

[22] Filed: Jul. 31, 1996

[30] Foreign Application Priority Data

Aug. 1, 1995 [BE] Belgium ................ 09500664

[51] Int. Cl.$^6$ ............................................. B28B 1/44
[52] U.S. Cl. ............................... 264/312; 264/328.2
[58] Field of Search ........................ 264/312, 328.12

[56] References Cited

U.S. PATENT DOCUMENTS 3,907,952  9/1975  Cleereman .
4,614,629  9/1986  Economy .................... 264/310
4,783,301  11/1988  Hong .

FOREIGN PATENT DOCUMENTS 1156946  7/1996  United Kingdom .

OTHER PUBLICATIONS

H.M. Laun: "Description of the non-linear shear behaviour of a low density polyethylene melt by means of an ... ". In: Rheologica Acta, An Internal Journal of Rheology, vol. 17, No. 1, Jan/Feb. 1978, pp. 1–15.

*Primary Examiner*—James Derrington
*Attorney, Agent, or Firm*—Spencer & Frank

[57] ABSTRACT

Process for injection moulding on a rotating core of a thermoplastic material exhibiting a modulus of relaxation in shear $G_n(7.5)$ higher than 0.15. This process, which gives good results with polyolefins, makes it possible to manufacture articles such as receptacles and cylinders exhibiting good mechanical properties.

9 Claims, No Drawings

PROCESS FOR MOULDING A THERMOPLASTIC MATERIAL BY INJECTION ONTO A ROTATING CORE

FIELD OF THE INVENTION

The present invention relates to a process for moulding a thermoplastic material by injection onto a rotating core.

TECHNOLOGY REVIEW

The technique of injection moulding onto a rotating core, described especially in U.S. Pat. No. 3,907,952, makes it possible to manufacture articles exhibiting a symmetry of revolution and good mechanical strength. It consists in injecting a molten thermoplastic material into a mould a part of which—generally a middle part which is referred to as a core—is rotatable in relation to the other and is conventionally kept rotating during the introduction of the thermoplastic material into the mould. This technique strongly orients the thermoplastic material in the circumferential direction, and this makes it possible to compensate the predominantly axial orientation induced by the injection in the case of the mould being filled from one end, and to "obliterate" possible weld lines in the case of a side filling of the mould. It is thus possible to obtain injection-moulded articles such as receptacles, cylinders, sleeves, and the like, whose mechanical strength is greater than that of articles injection-moulded by means of a conventional technique of injection moulding, that is to say into a mould in which all the parts are immobile in relation to one another.

However, the known processes for injection moulding onto a rotating core do not make it possible to manufacture articles several millimetres thick exhibiting satisfactory mechanical properties; in particular, their resistance to pressure is virtually identical to that which they would have exhibited if they had been injection-moulded without the core being rotated.

Thermoplastic materials employed hitherto for injection moulding, and in particular for injection moulding onto a rotating core, have a low viscosity. It was generally considered that highly viscous thermoplastic materials are not suitable for injection moulding and that their use results in numerous disadvantages; in particular, it requires an apparatus which withstands high pressures, increases the length of the injection cycles and causes the formation of untimely stress fields that can be detrimental to the mechanical strength of the injection-moulded articles.

SUMMARY OF THE INVENTION

It has now been found that the mechanical strength of articles manufactured by injection moulding onto a rotary core of a thermoplastic material, and especially of thick articles, can be considerably improved by a judicious choice of the thermoplastic material employed.

DETAILED DESCRIPTION OF THE INVENTION

More precisely, the present invention aims to provide an improved process for moulding a thermoplastic material by injection onto a rotating core, characterized in that the thermoplastic material has a modulus of relaxation in shear $G_n$ (7.5) higher than 0.15.

$G_n$ (7.5) denotes the normalized value of the modulus of relaxation in shear of the thermoplastic material, G(t) (as described by H. M. Laun in Rheologica Acta, vol. 17, No. 1 (Jan./Feb. 1978), pp. 1–15, in particular in equation [8]), at 7.5 seconds and at a temperature 30° C. higher than the melting temperature of the thermoplastic material in question ($T_m$ as measured by DSC (differential scanning calorimetry) at a rate of 10K per minute). More precisely, on the basis of measurements of the elastic and viscous moduli as a function of the excitation frequency (from 0.01 to 100 $s^{-1}$), the generalized Maxwell modulus which comes closest thereto is deduced. This model then makes it possible to plot a curve representing the change of the modulus of relaxation in shear as a function of time, which is normalized so that $G_n$ (t)=100 for t=0. In other words, $G_n$ (t)=100×G(t)/G(0). The value of $G_n$ (t) for t=7.5 s is then read off this curve. The Applicant Company has found that, among all the values of t at which the modulus of relaxation in shear $G_n$ (t) can be evaluated, it is in the case of t=7.5 s that it is possible to define the most reliable and the most uniform criterion making it possible to characterize the thermoplastic materials which give the best results when they are injection-moulded onto a rotating core.

This modulus of relaxation in shear is preferably higher than 0.2, particularly preferably higher than 0.3 and ideally higher than 0.5. Furthermore, it is preferred that the value of $G_n$ (7.5) should be lower than 10 and very particularly lower than 5.

In addition, the thermoplastic material employed preferably exhibits properties that are generally required with a view to injection moulding, for example good demouldability, good behaviour under high shear, good heat stability and the like.

The thermoplastic material in question includes at least one thermoplastic polymer. The thermoplastic material preferably consists essentially of at least one thermoplastic polymer. Any thermoplastic polymer may be employed, especially vinyl chloride polymers, polyamides and polyolefins. Good results have been obtained when the thermoplastic material includes at least one polyolefin. Among the polyolefins it is preferred to employ monoolefin polymers such as ethylene and/or propylene polymers (including their copolymers additionally including one or several other monomers).

Good results have been obtained when the thermoplastic material includes at least one semicrystalline thermoplastic polymer. At least 50 mass% of the thermoplastic material preferably consists of one or several semicrystalline thermoplastic polymers. In a particularly preferred manner the thermoplastic material consists essentially of one or several semicrystalline thermoplastic polymers. Semicrystalline thermoplastic polymers are intended to denote thermoplastic polymers which are not amorphous. Examples of semicrystalline thermoplastic polymers are polyamides (in particular aromatic ones), polyphenylene sulphide, polyethylene and polypropylene.

Furthermore, it is advantageous to employ thermoplastic polymers which crystallize rapidly, such as, for example, polyethylene (PE). If need be, a nucleating agent may be added to a thermoplastic polymer which, in its own right, might not exhibit a rapid crystallization.

In addition to at least one thermoplastic polymer the thermoplastic material which is injection-moulded may optionally include at least one filler.

Any known filler can be employed. Examples of fillers that can be employed, given without any limitation being implied, are talc, calcium carbonate and mica. It is preferred to employ anisotropic fillers, for example in the form of flakes or fibres. The use of fibres is advantageous where mechanical properties are concerned. Examples of fibres which may be mentioned are glass and carbon fibres and polymeric fibres such as aramid fibres. It is preferred to employ a filler including glass fibres. The improvement in the results is especially remarkable when the content of the filler(s) exceeds 10% and in particular exceeds 20%, relative to the total weight of the thermoplastic material and of the filler(s).

Finally, the thermoplastic material may also optionally contain one or several conventional additives such as pigments, antioxidants, stabilizers, flame retardants and the like.

As indicated above, injection onto a rotating core consists in injecting a molten thermoplastic material into a mould including at least two parts rotating in relation to one another, defining a closed volume.

The mould generally includes a central member (core) placed inside a hollow member (cavity). The core is usually symmetrical in revolution, for example cylindrical or conical, it being possible for the cavity to be symmetrical in revolution or virtually symmetrical in revolution, that is to say that it may optionally comprise one or more portions that are not symmetrical in revolution, such as, for example, a rib or a boss extending axially or helically, as a hollow or in relief, over at least a portion of its length. It is thus possible to manufacture, for example, a "cylinder" in which the central cavity would have a circular section and the external surface an octagonal section. It is highly recommended that the axes of symmetry or of virtual symmetry of the core and of the cavity should be at least approximately coincident and/or at least approximately parallel. Their axes are preferably precisely coincident. It is convenient that the core should be rotatable in relation to the stationary cavity. However, nothing prevents the core from being stationary and the cavity rotatable, or else both being rotatable at different speeds.

According to a particular alternative form, the core does not exhibit a symmetry of revolution; for example, it would be possible to employ a core whose cross-section would be polygonal over at least a portion of its length.

The relative rotation of the different parts of the mould may begin during the stage of injection of the thermoplastic material into the mould, also called filling stage. It is also possible to make it begin during the dwell stage, which begins when the mould is entirely filled with thermoplastic material and ends when the latter ceases to be kept under pressure. The relative rotation of the different parts of the mould advantageously continues for at least a proportion of the dwell stage, and optionally beyond the latter, for example for a predetermined period, or until the thermoplastic material has reached a certain viscosity threshold following its cooling (which may, for example, be ascertained by continuously measuring the torque or the power delivered by the motor providing this rotation). In the case of articles whose thickness is of the order of 1 to 5 mm, the period of rotation is generally from approximately 10 to 120 s, preferably from 30 to 80 s. This period is related to the nature of the thermoplastic material and in particular to its solidification time, which increases approximately as the square of the thickness of the article.

It is advantageous that the rotation should be stopped before the end of the dwell stage. The rotation period is preferably at least 10% of the duration of the dwell stage. It is furthermore advantageously not more than 90% of this duration.

The relative speed of rotation of the different parts of the mould is in general such that the average rate of shear to which the thermoplastic material is subjected is at least 25 $s^{-1}$, preferably higher than 30 $s^{-1}$. It is furthermore generally such that this rate is not more than 80 $s^{-1}$, preferably lower than 70 $s^{-1}$. The average rate of shear in question (in $s^{-1}$) may be considered as having the value $2\pi\, N\, r_c/t$, where N denotes the angular rate of rotation of the core in relation to the mould (in revolutions per s), $r_c$ the diameter of this core and t the mean thickness of the wall of the article.

The process of moulding by injection onto a rotating core of the invention makes it possible to manufacture numerous types of articles that are at least approximately symmetrical in revolution, such as receptacles, cylinders, sleeves and the like, exhibiting excellent mechanical properties. These articles may, however, optionally comprise one of more portions which are not symmetrical in revolution, hollowed out or in relief, such as ribs, bosses, grooves or the like.

It has been found that the process for moulding by injection onto a rotating core, defined above, is highly advantageous when applied to the manufacture of articles in which at least a portion has a thickness of at least 2 mm, and more particularly of at least 3 mm, in contrast to the known processes which in such cases produce an insignificant increase in the resistance to pressure.

As explained above, because of their considerable viscosity, the thermoplastic materials defined above by their modulus of relaxation in shear were never injection-moulded (conventionally or on a rotating core). Surprisingly, despite the disadvantages which are generally associated with this viscosity, the use of such thermoplastic materials is nevertheless extremely advantageous within the scope of the present invention and makes it possible to manufacture articles exhibiting remarkable mechanical properties.

EXAMPLES

The following examples illustrate the advantages of the invention, no limitation being implied.

Cylinders of 25 mm internal diameter, 32 mm external diameter and 150 mm in length were injection-moulded on an injection press of Engel 250 T type, fitted with a 55 mm diameter screw. The injection moulding conditions were:

| | |
|---|---|
| injection speed: | 20 mm/s |
| dwell pressure (hydraulic): | 40 bars |
| duration of the filling stage: | 4 s |
| duration of the dwell stage: | 30 s |
| stock temperature: | 260° C. |

The thermoplastic material was injected from one end of the mould.

The core constituting the male part of the mould was driven by a Mannesman Rexroth hydraulic motor of MZA 210A type (max. torque 500 Nm at 200 rev/min; max. speed 350 rev/min), powered by a Vickers hydraulic unit. When operating, the motor was controlled so as to apply to the thermoplastic material a mean shear rate of 23 $s^{-1}$, this being for 45 s. The period of rotation of the core began at the start of the filling stage and therefore continued 11 s after the end of the dwell stage.

The cylinders thus produced are evaluated after having been reduced by sawing to a length of 100 mm, this being done by means of a test for measuring the instantaneous bursting pressure or a measurement of the duration of resistance to bursting at a constant pressure.

In the case of the resistance to instantaneous bursting pressure the test is performed at ambient temperature with the aid of a manual pump which permits pressurizing at a rate of 20 bars per second. The cylinder is closed with metal end fittings at both its ends. In order to measure only the effect of the circumferential orientation produced by the rotation of the core, any axial stress on the cylinder is eliminated by connecting the two end fittings with a steel rod which prevents any lengthwise deformation. The cylinder is immersed in a trough filled with water to prevent any risk of explosion. Before immersion the cylinder is filled with water to prevent formation of air pockets. The pressure is increased and the pressure at which the cylinder bursts is recorded.

In the case of the measurement of the period of resistance to bursting, the cylinder is subjected to a constant pressure, without any rod for taking up axial stresses and the period after which the cylinder bursts is noted. Since the end fittings are then no longer connected by the steel rod, the influence of the axial stresses is thus also measured, which corresponds to a more realistic use.

The rheological properties are evaluated by means of a Rheometrics® R.D.S. rheogoniometer the plates of which describe an oscillating motion of low amplitude (1 to 10% as deformation (strain) in relation to the thickness of the sample). The principle and the interpretation of the measurement are detailed especially in the paper by H. M. Laun, already referred to.

Comparative tests 1R to 4R

By way of comparison, cylinders were injection-moulded in a conventional manner (without core rotation), from different types of high density polyethylene (HDPE) of Eltex® trademark (Solvay), of respective types A3180 (Ex. 1R), A1050 (Ex. 2R), B3002 (Ex.3R) and B5290 (Ex. 4R). The instantaneous bursting pressures measured were 70 bars each time.

Comparative examples 5R and 6R

The same thermoplastic materials as in Examples 1R and 2R respectively were injection-moulded, but this time with the core driven in rotation from the very beginning of the filling, for 45 s, so as to subject the thermoplastic material to a shear rate of 23 s$^{-1}$. The results are shown in Table 1.

Examples 7 and 8

The same thermoplastic materials as in Examples 3R and 4R respectively were injection-moulded, also with the core driven in rotation, this being in the same conditions as in Examples 5R and 6R. The results of these two tests in accordance with the invention are shown in Table 1.

Comparative examples 9R and 10R

A polypropylene of Eltex P HW206 trademark was injection-moulded in the same conditions, without (Ex. 9R) and with (Ex. 10R) rotation of the core respectively (in the same conditions as above). The results appear in the last line of Table 1.

TABLE 1

| Thermo-plastic material | $G_n$ (7.5) | Instantaneous bursting pressure (bars) | |
|---|---|---|---|
| | | without core rotation (Ex. 1R–4R and 9R) | with core rotation (Ex. 5R–8 and 10R) |
| PE A3180 | 1.13 × 10$^{-4}$ | 70 (1R) | 105 (5R) |
| PE A1050 | 30.7 × 10$^{-4}$ | 70 (2R) | 150 (6R) |
| PE B3002 | 28.1 × 10$^{-2}$ | 70 (3R) | 180 (7) |
| PE B5920 | 1.21 | 70 (4R) | 210 (8) |
| PP HW206 | 6.24 × 10$^{-4}$ | 95 (9R) | 105 (10R) |

Comparative examples 11R and 12R

The duration of resistance to bursting of the cylinders obtained according to Examples 2R and 6R respectively was measured at various pressures (Ex. 11R: 50, 40, 30 and 25 bars; Ex. 12R: 120, 100, 80, 70, 60, 50, 45 and 40 bars). When plotted on a log-log diagram (pressure/duration of resistance to bursting), the results of these measurements fall approximately on a straight line and it is therefore easily possible to estimate the pressure which these cylinders can withstand for a given time, for example 100 minutes (by interpolation) and 10 years (by extrapolation). These results appear in Table 2.

It is found that the bursting takes place approximately parallel to the axis of the cylinder (axially) both in the case of cylinder 11R and 12R. This reflects a circumferential (tangential) resistance which is lower than the axial resistance (in the long term). When examples 11R (injection without rotation) and 12R (injection with rotation) are compared, it is found that the use of a thermoplastic material not in accordance with the invention allows the technique of injection onto a rotating core to produce only a slight improvement in the resistance to pressure in the short term.

Examples 13R (comparative) and 14

The duration of resistance to bursting of the cylinders obtained according to Examples 4R and 8, at pressures of 60, 50, 40, 35 and 30 bars in the case of Example 13R, and at 100, 90, 80, 75 and 60 bars in the case of Example 14 was evaluated in the same way. The bursting pressure interpolated at 100 minutes and extrapolated to 10 years has also been reported in Table 2.

In contrast to Examples 11R and 12R, the cylinder obtained by injection onto a rotating core in accordance with the invention (Ex. 14) exhibits a bursting pressure extrapolated to 10 years which is markedly superior to that of Ex. 13R (without rotation). In addition, in the case of Ex. 14, the burst occurs approximately perpendicularly to the axis of the cylinder, which means that under the effect of the rotation of the core the circumferential (tangential) resistance exceeds the axial resistance.

These results show that when the resin has a high $G_n$ (7.5) modulus, the circumferential orientation induced by the rotation of the core makes it possible to compensate the "natural" axial orientation induced by the injection, and thus to obtain articles whose mechanical strength is more isotropic.

When Examples 13R (injection without rotation) and 14 (injection with rotation) are compared, it is found that the use of a thermoplastic material in accordance with the invention enables the technique of injection onto a rotating core to produce a big improvement in the resistance to pressure, this being both in the short term and in the long term.

It is found, furthermore, when the results of Examples 12R and 14 are observed, that the injection into a rotating core of a thermoplastic material in accordance with the invention makes it possible to manufacture articles exhibiting a resistance to pressure which is both higher and more stable in time than when a thermoplastic material not in accordance with the invention is employed.

TABLE 2

| | | Bursting pressure (bars) | |
|---|---|---|---|
| Examples | Core rotation | Interpolated at 100 minutes | Extrapolated to 10 years |
| 11R | no | 40 | 5 |
| 12R | yes | 60 | 5 |
| 13R | no | 40 | 15 |
| 14 | yes | 90 | 35 |

What is claimed is:

1. A process for moulding a thermoplastic material by injection into a hollow mold having a rotating core, said core having a period of rotation from 10 to 120 seconds, and said thermoplastic material having a modulus of relaxation in shear $G_n$ (7.5) higher than 0.15 and less than 10.

2. The process according to claim 1, in which the thermoplastic material has a modulus of relaxation in shear $G_n$ (7.5) higher than 0.3.

3. The process according to claim 1, in which the thermoplastic material includes at least one polyolefin.

4. The process according to claim 1, in which the thermoplastic material includes at least one semicrystalline thermoplastic polymer.

5. The process according to claim 1, in which the thermoplastic material includes at least one filler.

6. The process according to claim 5, in which the filler includes glass fibers.

7. In a process for the manufacture of articles in which at least a portion has a thickness of at least 2 mm the improvement comprising manufacturing said articles by moulding a thermoplastic material according to claim 1.

8. The process according to claim 1, in which the thermoplastic material is subjected to an average rate of shear from 25 to 80 $s^{-1}$.

9. A process for moulding a semicrystalline thermoplastic material by injection into a hollow mold having a rotating core, said core having a period of rotation from 10 to 120 seconds, said semicrystalline thermoplastic material subjected to an average rate of shear from 25 to 80 $s^{-1}$, and said semicrystalline thermoplastic material including at least one polyolefin and at least one filler including glass fibers, and having a modulus of relaxation in shear $G_n$ (7.5) higher than 0.3 and less than 10.

* * * * *